FIG.1.

March 15, 1938.   J. E. ALLAN   2,111,019
MEANS FOR DISTRIBUTING ELECTRICAL ENERGY AND FLUIDS
Filed July 13, 1936    10 Sheets-Sheet 6

FIG.6.

Inventor-
John E. Allan
By Jo Smurie
Atty

March 15, 1938. J. E. ALLAN 2,111,019
MEANS FOR DISTRIBUTING ELECTRICAL ENERGY AND FLUIDS
Filed July 13, 1936  10 Sheets-Sheet 10

Patented Mar. 15, 1938

2,111,019

UNITED STATES PATENT OFFICE 2,111,019

MEANS FOR DISTRIBUTING ELECTRICAL ENERGY AND FLUIDS

John Edward Allan, Prenton, Birkenhead, England

Application July 13, 1936, Serial No. 90,431
In Great Britain July 13, 1935

13 Claims. (Cl. 169—17)

This invention relates to improvements in electric wiring, fire extinguishing, and/or air or other fluid supplying or extracting installations, particularly such installations in ships, buildings, works and the like; the electric wiring installation usually distributes electrical energy to lighting power and heating apparatus; fire extinguishing installation distributes a fire extinguishing fluid to sprinklers; and the fluid supply or exhausting installation is usually employed to supply ozonated, sterilized, warmed or cooled air to the different compartments, or to extract, by means of a vacuum plant and the operation of vacuum cleaners, dust-laden air from said compartments.

Except in the case where a ship's hull forms a common return for the electric circuit, at least two electrical conductors have to be provided throughout the installation; and where there is a sprinkler installation or an air conditioning plant or a vacuum cleaning plant in the same ship or building separate conduits require to be carried throughout the installation; moreover the points of connection for the sprinklers, and for the air supply or vacuum devices are in the main co-terminous with the points at which the electrical apparatus is connected to the electric supply conductor; and the object of the invention is to combine two or more of the said installations in order to reduce the cost of material and erection, and to obtain other advantages from the combination.

In carrying out the invention I employ what will be termed conductor-conduits common to the installations combined and through the wall and bore of which respectively, the electrical energy and the fluid are distributed.

In accordance with existing practice insulated electric conduits and sprinkler conduits where they are fitted on board ship or in large buildings or works are laid for the greater part of their length out of reach or through ducts or spaces provided for the purpose which are covered in so as to be accessible only to those in authority, and the conductor-conduits arranged, according to the invention, would preferably be bare copper pipes located out of reach or in said ducts or spaces and be carried on solid insulators and would require no further protection against accidental contact; where, however, the conductor-conduit is to be located in positions not protected against accidental contact the conduit is in addition to being insulated from earth, protected against such accidental contact. Comparatively small branches to electric lights, radiators and the like would be of ordinary insulated cable, and small branches to sprinklers, vacuum cleaner connections and the like would be earthed and be insulated from the main conductor-conduits.

As the conductor-conduits are much stiffer transversely than a solid conductor of the same cross-sectional area, the solid insulators by which the conductor-conduits are supported may be pitched much wider apart than is the case with solid or stranded conductors, with the corresponding reduction in the cost of installation; and as the cross-sectional area necessary with the tubular form is greater than that usual for the current rating, the voltage drop per foot run is small so that exceptional low voltage distribution can be employed.

I have illustrated my invention in the accompanying drawings, which in the main are diagrammatic.

Figs. 8 to 13 illustrate details of construction.

Figure 1:
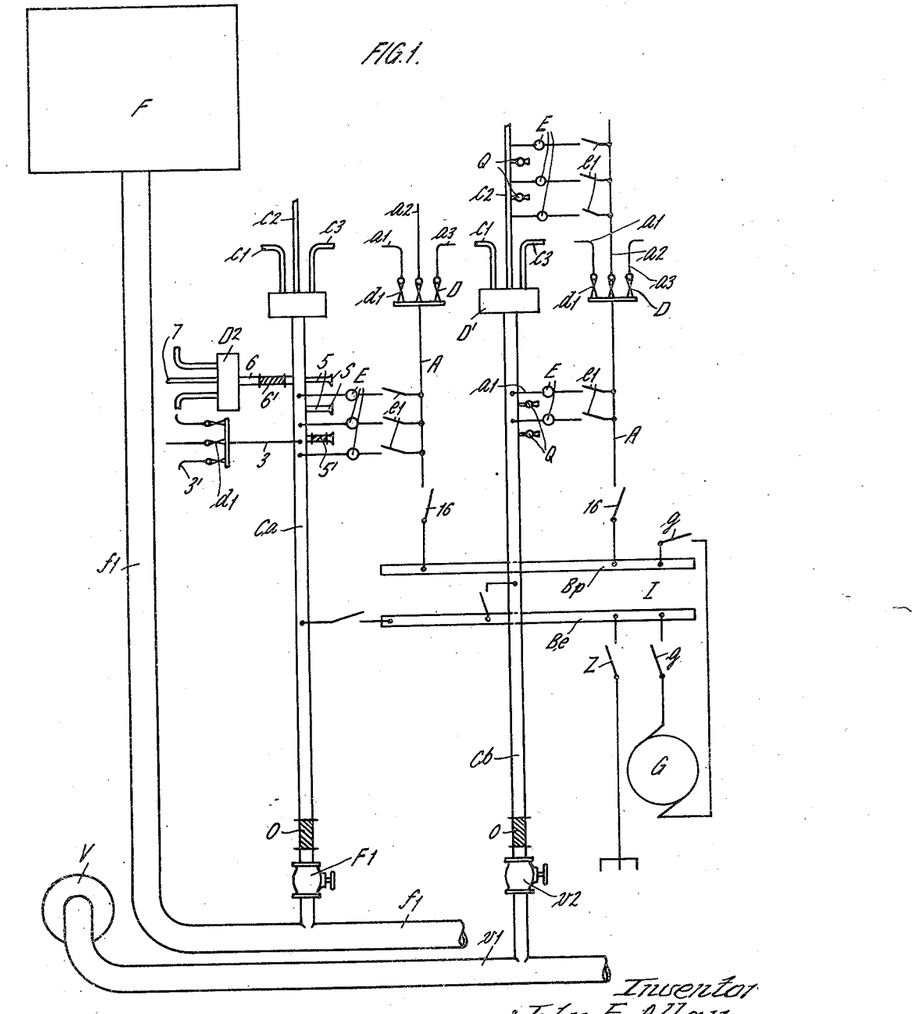
Fig. 1 shows the invention applied to a two-wire electrical system in which one wire, under normal conditions, is maintained at earth potential.

Referring first to Fig. 1 which illustrates my invention as applied to a two-wire system in which one of the wires is, under normal working conditions, maintained at "earth" potential;—

G is an electrical generator to maintain the desired electrical potential between the positive and earth busbars Bp and Be to which the generator is connected by the switches g, Bp being usually at positive potential and Be being, under normal conditions, maintained through the switch Z at earth potential.

A is a feeder comprising an electrical conductor of any suitable insulated type, such as paper or rubber insulated cable, D is a distribution fuse box at which the conductor A is sub-divided by fuses d1 into distributing conductors of which three a1, a2, a3 are shown; these conductors form the positive side of the electrical installation.

F is a suitable source of fluid maintained at a pressure different from that of the atmosphere; the said fluid may be water, or other fire extinguishing fluid maintained at a pressure substantially greater than that of the atmosphere; f1 is the main supply pipe led from F to the vicinity of the switchboard I at a central station in the building or ship.

Ca is the conductor-conduit which serves as part of the system distributing electrical energy from the generator G to current consuming devices, such as lights E, and also serves to distribute the fluid from F to the points at which it has to be supplied for example the sprinklers S.

The conductor-conduit Ca is a hollow pipe of suitable conducting metal such as copper, and its bore is connected through a control valve F1 to a source of fluid pressure through the main pipe f1. In ordinary installations there would be several conductor-conduits leading from a central main switchboard I as feeders. The feeders may be untapped between the switchboard I and the distributing boxes D1, but usually individual connections for light or power may be tapped off and comprise, in individual cases, conductors 1 connected by a clamping connection to the exterior of the conductor connectors Ca, the circuit being completed by the light or other current consuming device E and the switch e1 connected to the ordinary insulated conductor A; or branch conductors 3 may connect the conductor-conduit through fuses d1 to branch circuits 3' containing current consuming devices, the other poles of the said circuits being connected to the conductor A.

The sprinklers S would be connected to the conductor-conduit either individually by pipes 5 making fluid-tight joint with the conductor connector; or by a branch pipe 6 leading through fluid distribution casings D2 to branch sprinkler conduits 7; the pipes 5 and the branch pipes 6 may, respectively comprise lengths 5' and 6' of conduit of insulating material.

Where the fluid to be carried by the conductor-conduits is air to be supplied to or extracted from various points in the system, the conductor-conduit, for example Cb, Fig. 1, is connected through a valve v2 to a main pipe v1, which in turn is connected to a fan V to supply air at a pressure different from that of the atmosphere; if the pipe v1 be connected to the outlet of the fan then air (which may be sterilized heated or cooled) may be delivered to cocks Q fitted to the conductor-conduit or to branches thereof, so that upon opening of any of these cocks said air is delivered as may be required.

When the pipe v1 is connected to the inlet to the fan, the cocks Q may be employed to withdraw air from a suction cleaning device consisting of a suitable nozzle and a flexible pipe connected thereto, which pipe is connected to a convenient cock Q.

As stated, the busbar Be is normally connected to earth by the switch Z, but it is desirable that the whole of the electrical connections to this busbar shall for testing and other purposes be capable of being insulated, the conductor-conduits such as Ca and Cb are therefore supported from the wall, ceiling, deck or the like by any suitable insulating means, usually solid insulators arranged at intervals; but as it is undesirable to have to insulate the pipes f1 and v1 and the devices F and V, an isolating tubular section O of the conductor-conduit is fitted at a point near the valve F1, or the valve v2 as the case may be; the isolator would be a short flanged length having a bore equal to the bore of the conductor-conduit; it will be seen, assuming the fluid which is supplied by the pipe f1 is an insulator such as $CO_2$, and that dry air is supplied by the pipe v1 that on opening the switch Z, the whole of the electrical connections to the conductor-conduits Ca and Cb and busbar Be would be insulated for testing or other purposes.

In sprinkler installations the system for the supply under pressure from the source F may be water, in which case it would be desirable not only to insulate the conductor Ca but also the water therein from the water in the pipe f1, and this may be accomplished by making the valve F1 of insulating material so that when it is closed the water in the system is insulated from the water in the pipe f1.

In a combined electrical and sprinkler installation in which the system is initially charged with a gas, such as air, under pressure, and in which when, by the operation of a sprinkler, this pressure has been reduced below a prescribed limit, water is supplied to the system, the arrangement according to the invention is modified as hereinafter described.

Figure 2:
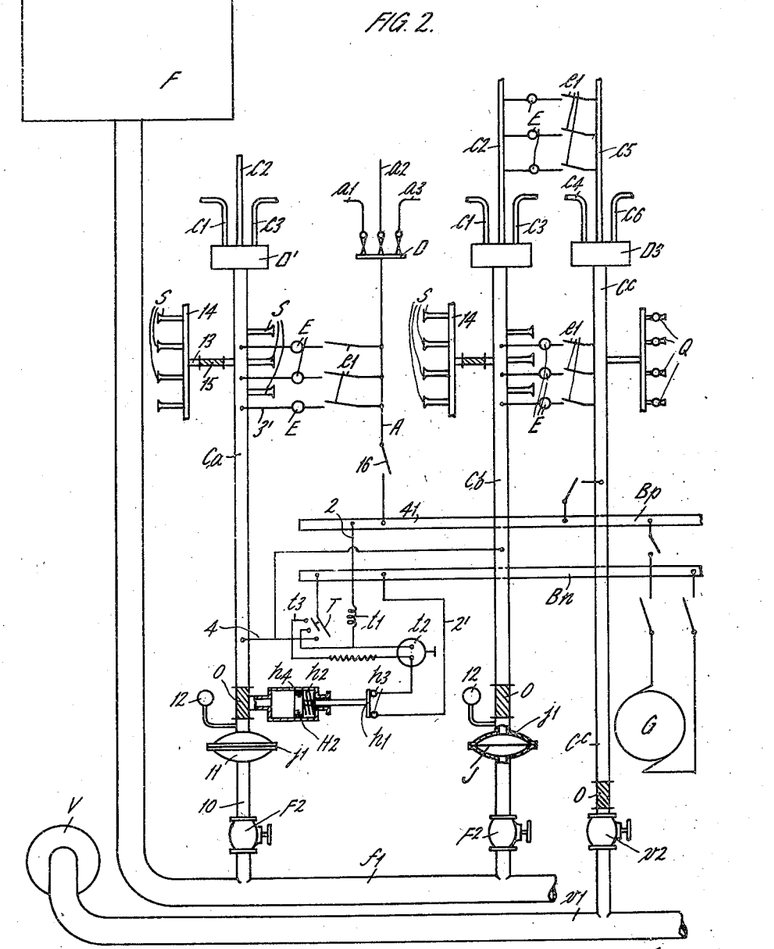
Fig. 2 illustrates the arrangement in which the fluid distributed to the sprinklers is water.

Referring now to Fig. 2;—this illustrates an arrangement in which the fluid distributed to the sprinklers is water, and in which it is desired that the conductor-conduit as well as the water therein may be insulated from the water supply means and the pipe connected thereto, and that, when a sprinkler is operated, the electric supply to the conductor-conduit shall be cut off.

Two conductor-conduits Ca and Cb are shown as being connected up to a supply of electrical energy and adapted to convey the fluid for operating a sprinkler installation, the conductor-conduit Cc being shown, as in Fig. 1, connected to supply electrical energy, and to supply air to cocks Q, or to exhaust air from these cocks to operate vacuum cleaners.

The conductor-conduits Ca are connected through the valve F2 and main pipe f1 to fluid pressure supply means F which in this case provides water under a pressure substantially greater than that of the atmosphere. The conductor-conduit is insulated from F2, f1 and F by an insulating diaphragm fitting j1, which fitting consists of two parts, each of which has a flanged extension 10 and a flanged spherical portion 11 between the flanges of which latter a thin diaphragm J of rubber or the like is stretched. The fitting is made of insulating material and it insulates the conductor-conduit Ca from the valve F2; 12 is a pressure gauge.

Figure 7:
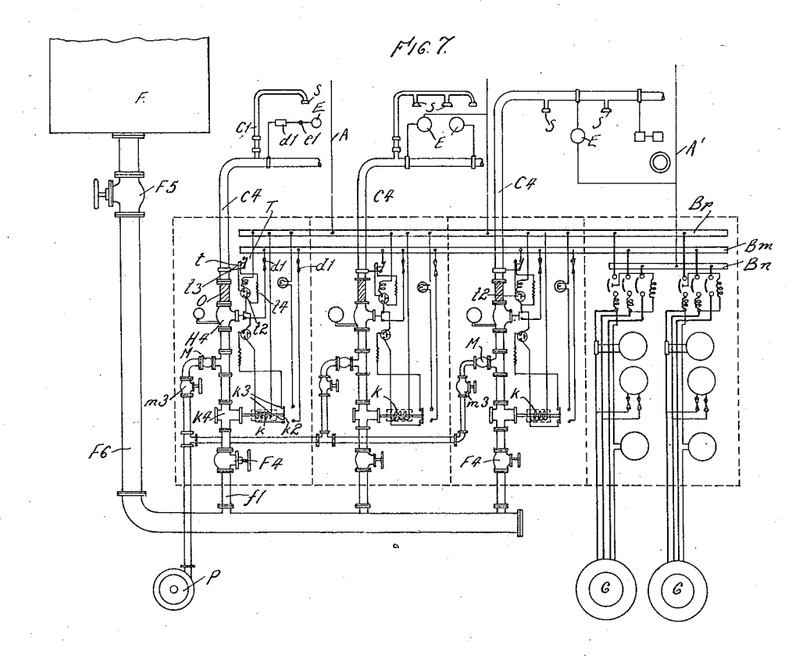
Fig. 7 shows the general arrangement in which the individual circuits are arranged substantially as described with reference to Fig. 4.

The two conductor-conduits Ca and Cb are respectively electrically connected through the conductors 4 and 4' to the busbar Bn by the contactor T, the operating coil t1 of which is connected across the busbars through the press button switch $t2$, and through the contacts $t3$. $t4$ is an economy coil which when the contactor is closed and connects contacts $t3$, short-circuits the press button switch. Two contactors T may be fitted, as shown in Fig. 7, one for each conductor-conduit $Ca$, $Cb$.

The circuit of the operating coil $t1$ of each of the contactors T is as follows:—

From the busbar $Bp$, by conductor 2, operating coil $t1$, push button switch $t2$, contacts $h3$, and conductor 2', to busbar $Bn$.

$H2$ is a plunger fitting the cylinder $h4$ of a cut-out device, the left-hand end of which cylinder is in communication with the bore of the conductor-conduit $Ca$. The plunger is fitted with a spring $h2$, which normally tends to move it to the left-hand end of the cylinder, and is connected to a switch $h1$, and when the interior of conductor-conduits $Ca$ are subjected to the normal fluid pressure, the plunger moves in opposition to the spring, and the switch $h1$ connects the contacts $h3$. If, under these circumstances, the press button switches $t2$ are closed, the two conductor-conduits $Ca$ and $Cb$ are connected to the busbar $Bn$.

In Fig. 2 the feeder conductor-conduits $Ca$ and $Cb$ supplying sprinklers are for the sake of simplicity of connections shown connected to the electric supply mains by a common contactor T controlled by a pressure device $H2$ connected to the conductor-conduit $Ca$. Preferably, however, each feeder conductor-conduit feeding sprinklers would be connected to the electric supply by a separate contactor and would be fitted with a pressure-operated device controlling a switch in the control circuit of the contactor, such arrangement being shown in Fig. 7.

The ordinary insulated feeder A is connected by the switch 16 to the busbar $Bp$, and to a distribution box D from which branch the mains $a1$, $a2$, $a3$ are led; and each conductor-conduit $Ca$ is connected to a distribution box $D1$ from which branch conductors $c1$, $c2$, $c3$ are led.

The sprinklers are connected to the interior of the bore of $Ca$; and the current consuming devices E are connected either in groups by branch conductors 3' and fuses $d1$ across from $Ca$ (or its branches) to the ordinary feeder A (or to its branches $a1$, $a2$ and $a3$). The sprinklers may be connected directly, or groups of feeders may be connected by a branch pipe 13 and distribution pipe 14, the latter pipe being of steel and uninsulated, and the branch 13 having an insulating length 15.

The action is as follows:—

Should a fire occur in any section fed by a conductor-conduit $Ca$ and a sprinkler be operated there will immediately be a fall of pressure in the conductor-conduit $Ca$ feeding that section, due to the distension of the diaphragm J, whereupon the spring $h2$ would force the plunger $H2$ inwardly and the switch $h1$ would open the contacts $h3$ which would break the circuit of the operating coil $t1$ of the corresponding contactor T, the latter then opening and disconnecting the electric supply from the feeder $Ca$ of the section. The excess pressure on the supply side of the diaphragm J would, when said excess pressure reached a predetermined value cause the fracture of the diaphragm, whereupon F would supply water to the sprinkler which was operated.

In the same way should there be a short-circuit contact at any point in the conductor-conduits resulting in the fusion of the conduit, the escape of fluid in the damaged part would result in the corresponding contactor T opening and disconnecting the conductor-conduit from the electrical supply, the water issuing from the fracture serving to quench any fire which may have been originated by the fracture.

This arrangement is equally applicable where the conductor-conduit is used to supply air to or extract air from a number of conveniently located stop cocks. Preferably one of the conductor-conduits $Cb$ would be arranged and connected as described, but, instead of an ordinary insulated positive feeder main A being used as the positive for this negative conductor-conduit, a conductor-conduit $Cc$ would be employed which would be connected through the switch 16 to the positive busbar $Bp$, the bore of the conductor-conduit $Cc$ being connected through the valve $v2$ and air main $v1$ to a pressure or exhaust fan V and be insulated from the latter by means of an insulating length O; the bore of the conductor-conduit $Cc$ would be connected to the distributed stop cocks Q and through a distributing box $D3$ to branch conductor-conduits $c4$, $c5$, $c6$ corresponding to the branch conductors $c1$, $c2$, $c3$ and serving corresponding portions of the installation.

The current consuming devices, for example the lights E, would be connected across the appropriate conductor-conduit $Cb$ and the conductor-conduit $Cc$, or their branches, and these two conductor-conduits would usually be led into each compartment in the building or into staterooms on a ship; the electrical distributing system would thus be combined with a sprinkler arrangement as well as with an air extracting or air supplying arrangement; usually the one conductor-conduit would be used to convey a fluid to the sprinklers and the other would be used for operating vacuum cleaners at the several stop cocks Q. The conductor-conduits $Cc$ would be carried on insulators as described in connection with the conduits $Ca$.

Figure 3:
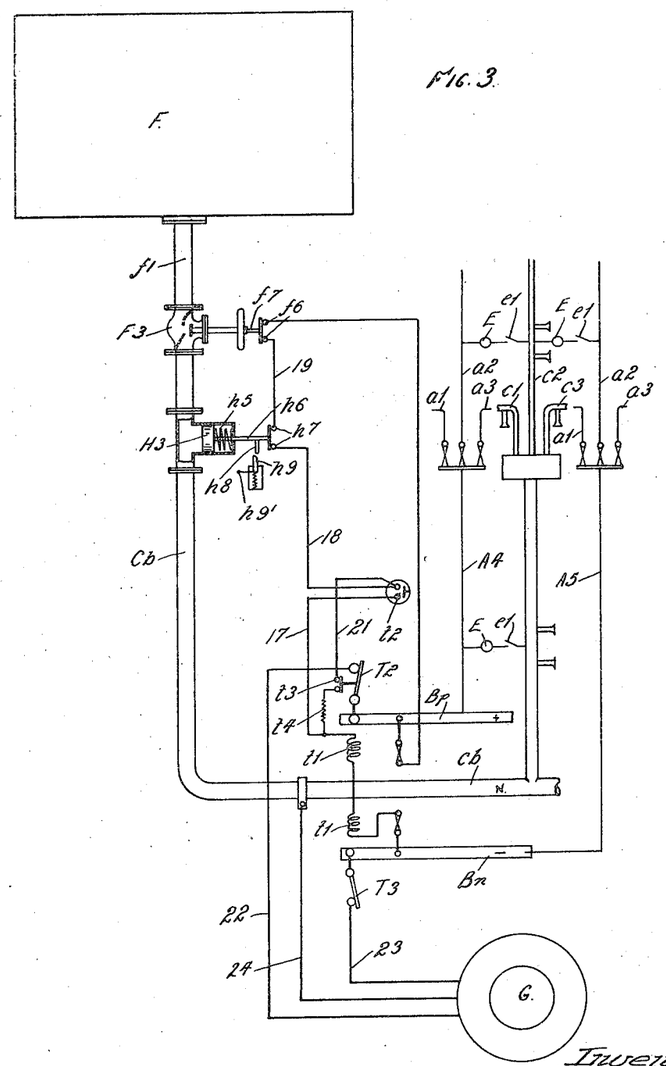
Fig. 3 shows an arrangement in which the conductor-conduit is the neutral conductor of a three-wire system.

Referring now to Figure 3 which shows the arrangement when the conductor-conduit $Cb$ forms the neutral conductor of a three-wire system. The positive and negative terminals of generator G are connected through circuit-breakers $T3$ and $T2$ to the negative main $Bn$ and positive main $Bp$ respectively, the two operating coils $t1$ of the circuit-breaker are connected in series across the busbars $Bp$ and $Bn$ the circuit being as follows:—from the negative busbar through coils $t1$, conductor 17, press-button switch $t2$, conductor 18, contacts $h7$, conductor 19, contacts $f6$, conductor 20 to the positive main; $t4$ is an economy coil, one end of which is connected to conductor 17, the other end being connected to one of the contacts $t3$ closed by the contactor $T2$ when the latter is closed, the other contact $t3$ is connected by the conductor 21 to one of the contacts of the press button, thus short-circuiting the contacts of the latter when the contactor $T2$ is closed so that the press button may be released and the contactor held closed by the current through the economy coil.

F is a source of fluid pressure, in this case a supply of water under pressure connected by the pipe $f1$ to a valve $F3$ and through the casing $h5$ of the cut-out plunger $H3$ to the conductor-conduit $Cb$; the spindle of the valve $F3$ carries a switch $f7$ which closes the contacts $f6$ when the valve is full open; the switch $h6$ carried by the plunger $H3$ closes the contacts $h7$ when the pressure within the conductor-conduit $Cd$ is normal.

The spindle of the plunger H3 which is connected to the switch $h6$ has a projecting portion $h8$ which engages with a spring detent $h9$ pivoted at $h9'$ so that should the pressure in conductor-conduit $Cb$ fall below the normal and the plunger H3 move inwardly, the part $h8$ trips the detent and passes it, so that should the pressure rise in $Cb$ the detent prevents the switch $h6$ again closing contacts $h7$ until the apparatus is reset by hand.

The conductor-conduit $Cb$ is carried on insulators as described in connection with the conductor-conduits $Ca$ and $Cc$.

The conductor $Cb$ forms the neutral busbar and may therefore be at earth potential; the positive and negative ordinary insulated mains A4 and A5 and the neutral conductor-conduit $Cb$ form the three wires of the electrical distributing system; the neutral $Cb$ being carried into each apartment in the building or berth in a ship together with either the positive A4 or the negative A5, the current consuming devices such as the lights E are connected through switches $e1$ either between A4 and $Cb$ or between A5 and $Cb$; and the sprinklers S are connected to the bore of the conductor-conduit $Cb$.

Assuming the valve F3 to be fully open, the contacts $f6$ would be connected together, and, assuming the bore of $Cb$ to be subjected to normal water pressure, the contacts $h7$ would be closed; when therefore the press button $t2$ is operated the contactors T2 and T3 close, and connect the positive and negative terminals of the generator by the conductors 22 and 23 to the busbars $Bp$ and $Bn$, the middle wire of the generator being connected by the conductor 24 to the conductor-conduit $Cb$.

Should a sprinkler be operated the pressure in the bore of $Cb$ falls, the cut-out plunger H3 moves inwardly and breaks the circuit of the contactor hold-on coils at the contacts $h7$, whereupon the contactors open and disconnect the positive and negative mains A4 and A5 and busbars $Bp$ and $Bn$ from the generator.

Figure 4:
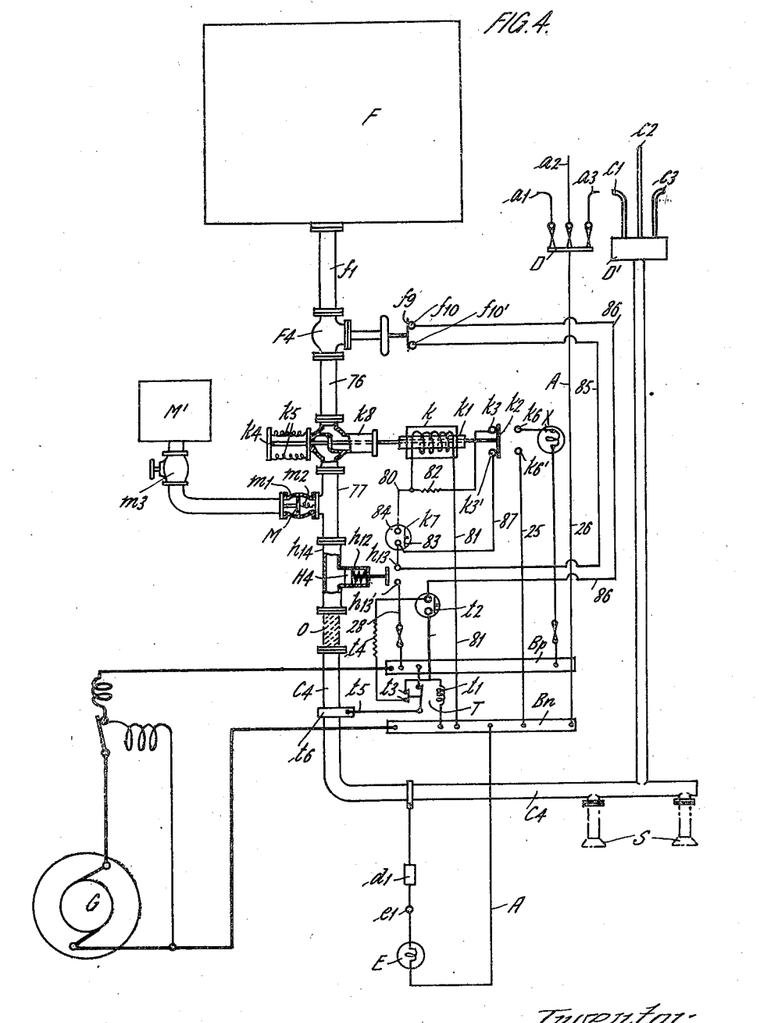
Fig. 4 shows the arrangement in which the sprinkler-system connected to a supply of water is initially charged with air.

Figure 4 shows the arrangement in which the sprinkler system connected to a supply of water is initially charged with air.

G is the electric generator connected to the busbars $Bp$ and $Bn$; C4 is the conductor-conduit which is connected to a source of fluid pressure F, which in this case would be a tank containing water at a desired head; the tank is connected through the pipe $f1$, hand-operated valve F4, length of conduit 76, automatic water control valve casing $k8$, T-piece 77 to the spring-controlled plunger cut-out casing $h14$ which in turn is connected by the insulating conduit section O to the conductor-conduit C4.

The handle of the valve F4 is fitted with a switch $f9$ which is adapted, when the valve is full open, to close contacts $f10$; the auto control water valve K4 is located in the casing $k8$, the spindle $k4$ of the valve being fitted with external springs $k5$ which tend to open the valve; when the valve is closed a switch $k2$ connects contacts $k3$, $k3'$; when the valve is open this switch connects contacts $k6$, $k6'$; the valve is closed by a solenoid $k$ acting on an armature $k1$ fitted to the valve spindle, to which spindle the switch $k2$ is attached; the T-piece 77 is fitted with a non-return air valve M through which air from a source of air pressure M1 enters the interior of the conduit system; the valve M is fitted with a spring $m2$ which normally tends to close it so that it constitutes a non-return valve.

The spindle of the spring-controlled cut-out valve H4 is fitted with a spring $h12$ and with a switch $h11$ which closes contacts $h13$, $h13'$, when the air pressure within the conductor-conduit is normal, but which spring, when the pressure falls below normal, moves the plunger so as to open the switch $h11$.

T is a contactor which, when closed, connects the positive busbar through the conductor $t5$ and connector $t6$ to the conductor-conduit C4; $t1$ is the closing coil of the contactor, $t2$ the contactor press-button switch; $t3$ contacts adapted to be closed by the contactor when the latter is closed and which, when closed, short-circuit the contacts of the press-button switch $t2$ through the economy resistance $t4$.

The closing coil $t1$ of the contactor T and the solenoid $k$ are adapted to be connected across the busbars $Bp$ and $Bn$, the circuit being as follows:—

From the busbar $Bp$, conductor 28, contacts $h13$, $h13'$, conductor 85, switch $f9$, contacts $f10$, conductor 86, switch $t2$, conductor 25, contactor closing coil $t1$ to busbar $Bn$; contact $h13$ is connected to the terminal 83 of the switch $k7$ and the other terminal 84 is connected by the conductor 80 to one end of the solenoid $k$, the other end of the latter being connected by conductor 81 to the busbar $Bn$. The economy coil 82 of the solenoid $k$ is connected between the conductor 80 and the contacts $k3$, the other contact $k3'$ being connected by conductor 87 to the terminal 83 of switch $k7$.

The action of the apparatus is as follows:—

In setting the apparatus the hand-operated valve F4 is closed, and the air control valve $m3$ is opened, whereupon air from M1, through valve M charges the conductor-conduit system on the delivery side of the valve F4, with air at normal pressure; the plunger H4 is then moved and closes the switch $h11$; the press button switch is then closed, the solenoid energized, the valve K4 closed and the contacts $k3$, $k3'$ connected by switch $k2$. The valve F4 is now opened, the contacts $f10$ closed by the switch $f9$ and pressure water from the source F charges the conduit up to the valve K4. In order that the valve F4 should not, inadvertently, be left closed, the contacts $f10$ are arranged in the circuit which has to be completed before the contactor closing coil $t1$ is energized. After the valve F4 has been opened the switch $t2$ is closed, the contactor then closes and connects the conductor-conduit C4 through the conductor $t5$ and connector $t6$ to the busbar $Bp$; the contacts $t3$ are closed and the contactor held closed by the circuit through the economy coil $t4$.

Should a sprinkler be operated and open, the pressure in the conduit C4 falls and the plunger H4 moved by its spring $h12$ opens the switch $h11$ which breaks the circuit of the coil $t1$ of the contactor T, which thereupon opens, and also breaks the circuit of the solenoid $k$ whereupon the valve K4 is opened by the spring $h5$. The electrical supply is thus cut off from the conductor-conduit and the bore of the latter put into communication with the water supply F. The non-return M valve prevents any water passing to the air supply pipe. When the valve K4 opens its switch $k2$ connects contacts $k6$, $k6'$ thereupon completing the circuit of the indicator X through the conductors 25 and 26.

Figure 5:
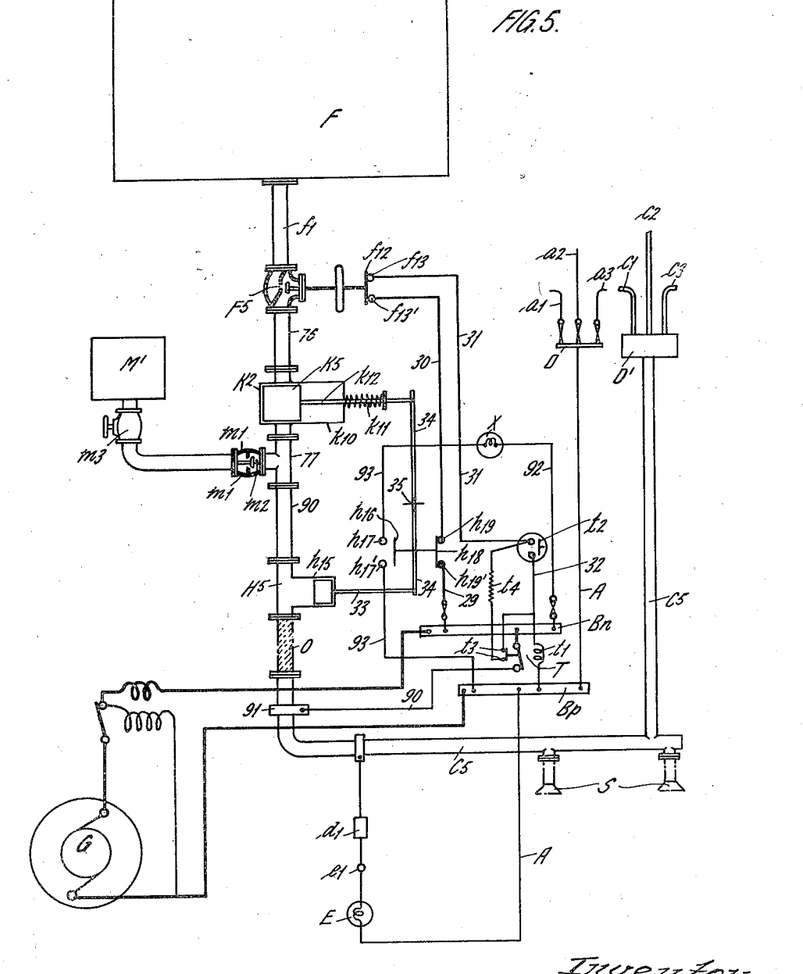
Fig. 5 shows a modification in which the automatic water control valve is operated mechanically.

Figure 5 shows a modification of Figure 4 in which the automatic water control valve K5 is operated mechanically by the cut-out control plunger H5.

The source F of water under pressure is connected by the pipe $f1$ through the casing of the stop valve F5, the length of conduit 76, the casing $k10$ of the water control valve, T-piece 77, length of conduit 90, casing $h15$ of the plunger H5 and insulating length of conductor O to the interior of the conductor-conduit C5.

The spindle of the valve F5 is fitted with a switch $f12$ which, when the valve is fully open, closes contacts $f13$ and $f13'$, the spindle $k12$ of the valve K2 is fitted with a spring $k11$ which tends normally to open the valve K5, the spindle 33 of the plunger H5 is connected to one end of the lever 34 pivoted at 35 and connected at its other end to the spindle $k12$ of the valve K5; the lever 34 has attached to it a switch $h16$ adapted to close contacts $h17$ and $h17'$ when the pressure in the interior of the conductor conduit falls below normal, and the pressure on the plunger H5 is no longer able to overcome the spring $k11$ so that H5 moves to the left and K5 opens, this lever also carries a switch $h18$ which in the position of the valve K5 and plunger H5 shown in the drawings closes contacts $h19$ and $h19'$.

The T-piece 77 carries the air valve M connected to a source of air pressure M1 and operates as described in connection with Figure 4.

The contactor T when closed is adapted to connect the busbar B$n$ through the conductor 90 and connection fitting 91 to the conductor conduit C5.

$t1, t2, t3, t4$ are, as described in connection with Figure 4, the opening coils, the press button switch, the economy coil contact and the economy coil of the circuit-breaker T; and X is a visible alarm signal. The contactor closing circuit is as follows:—busbar B$n$, conductor 29, contact $h19'$, switch $h18$, contact $h19$, conductor 30, contact $f13'$, switch $f12$, contact $f13$, conductor 31, press button switch $t2$, conductor 32, busbar B$p$, closing coil $t1$ of the contactor. The signal lamp X is connected to the positive busbar by the conductor 92; and by the conductor 93 through the contacts $h17$ and $h17'$ to the busbar B$p$.

The action is as follows:—the valve F5 is closed, the air control valve $m3$ is open and the interior of the conductor-conduit C5 up to the valve F5 is charged with air under pressure, whereupon the plunger H5 is moved to the right, the pressure on it overcoming the spring $k11$ and closing the valve K5. The water control valve F5 is now opened and when fully open its switch $f12$ closes the contacts $f13$, $f13'$; if now the contactor press button switch $t2$ is closed the contactor is closed through the circuit described, and the conductor C5 connected to the busbar B$n$; the current consuming devices, such as the lamp E, are connected across the conductor-conduit C5 to the positive busbar B$p$, they may be tapped as shown through fuses $d1$ and switches $e1$, usually they are, however, connected to the branch conduits $c1, c2, c3$ connected to the main conductor-conduit through the box D1 the connections to the positive busbar being made through ordinary insulated feeding mains A, fuse box D and branch connections $a1, a2, a3$, the sprinklers S are connected either directly to the main C5 or to the branch mains $c1, c2, c3$.

Figure 6:
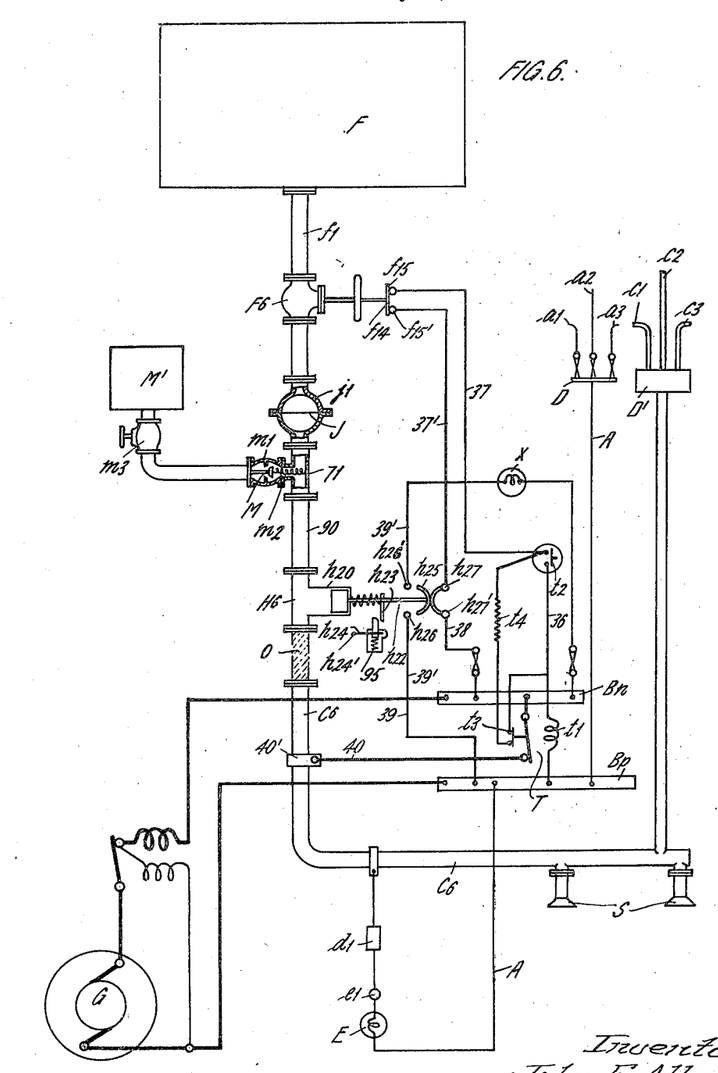
Fig. 6 shows an arrangement substantially similar to Fig. 4 in which the water control valve is replaced by a diaphragm.

Referring now to Figure 6; the arrangement is substantially similar to Figure 4 with the exception that instead of employing a solenoid-operated valve K4 to cut off the water supply from the system until a sprinkler is operated, a diaphragm fitting $j1$ is employed for this purpose as described in connection with Figure 2. In the arrangement of Figure 6 the pressure water from the tank F is supplied to the conductor conduit through the pipe $f1$, valve F6, conduit length 76 to the diaphragm fitting $j1$, the diaphragm J of which when its opposite sides are subjected to substantially equal pressures cuts off the water supply F from the conductor-conduit C6 but which when its sides are subjected to pressure substantially different it fractures and permits the flow of water through the fitting $j1$. The lower flanged opening of the fitting $j1$ is connected through the T-piece 77, conduit length 90, to the casing $h20$ of the spring-controlled cut-out plunger H6, the casing being connected by the insulating length of conduit O to the conductor-conduit C6.

The valve F6 is provided with a switch $f14$ adapted when the valve is open to close contacts $f15$ and $f15'$. To the T-piece 77 is fitted a non-return valve M constructed and arranged as described in Figures 4 and 5, connected through the control valve $m3$ to a source of air pressure M1.

The spindle $h22$ of the plunger H6 is fitted with a switch $h25$ and when the plunger is subject to normal pressure closes the contacts $h27$ and $h27'$ and which, when the pressure in the conductor-conduit falls below normal closes contacts $h26$, $h26'$. In order to stop hunting, the spindle is fitted with an engaging piece $h23$ which, when the plunger H6 moves to the left passes freely over a bellcrank detent lever $h24$ pivoted at $h24'$, and fitted with a spring 95 which urges the detent lever into the engaging position; should the pressure in the conductor-conduit fall the engaging piece $h23$ passes the detent and the switch $h25$ opens the contacts $h27$, $h27'$ and closes $h26$, $h26'$, the detent, however, prevents this switch being closed again except when the apparatus is reset by hand.

T is a contactor adapted to connect the busbar B$n$ through the main 40 and connector 40' to the conductor-conduit C6; $t1, t2, t3, t4$ are the contactor closing coil, press button switch, short-circuit contact, and economy resistance of the contactor; the control circuits are as follows:— from the positive main B$n$, coil $t1$, conductor 36, press button switch $t2$, conductor 37, contacts $f15$, $f15'$, conductor 37', contact $h27$, switch $h25$, contact $h27'$, and conductor 38 to the negative main.

The signal lamp X is connected across the busbars by the conductors 39 and 39', through the contacts $h26$ and $h26'$; the terminals of the generator G are connected to the busbars B$p$ and B$n$.

The current consuming devices E are connected across the conductor-conduit C6 in the positive main to switches $e1$ and fuses $d1$, usually, however, the connection is made between the branches $c1, c2, c3$ leading from the connection box D1 connected to the conductor-conduit C6, and branches $a1, a2, a3$ connected through the fuse box D through the positive feeder main A.

The action is as follows:—Valves F6 and M3 are opened gradually so as to admit water pressure on one side of the diaphragm J and air pressure on the other side and throughout the conductor-conduit C6, and these respective pressures rise to their normal value, that of the air being slightly in excess of the water, and the valve F6 being fully open and its switch $f14$ connecting the contacts $f15$ and $f15'$ and the switch $h25$ on the plunger H6 closing the contacts $h27$ and $h27'$, it will be seen that by closing the press button $t2$ the contactor T is closed and connects the conduit C6 through the connection 40' and conductor 40 to the negative busbar B$n$.

Fig. 7 shows a general arrangement comprising several distributing circuits similar to that shown in Fig. 4. The several parts are designated by the same reference letters and numerals employed in Fig. 4.

The tank F would contain water under pressure and be connected to fire pumps adapted to maintain a constant supply under pressure; F5 is a main valve and F6 a main supply pipe led to the switchboard room and from which the branch pipes $f1$ are led to the respective branch control valves F4. Two three-wire generators G are shown respectively connected to the positive, negative and mid-wire or neutral busbars. P is a pressure air-pump delivery to the common air main $p1$ which is connected through the several air-control valves $m3$ to the respective non-return valves M.

The bores of each of the conductor-conduits C4 are connected to sprinkler circuits, and the corresponding ordinary insulated conductors A and A' are connected to the positive and negative busbars as may be required to balance the system of which the conductor-conduits are the neutral or middle wire.

In some cases the ordinary insulated conductors A or A' may be replaced by a conductor-conduit such as C$^c$ (Fig. 2) adapted to be connected to stop cocks such as Q for air supply, or exhaust for vacuum cleaners, in which case two conductor-conduits would supply the three different services.

Small branch electric conductors would usually be of ordinary insulated wires; and small branch sprinkler conduits would be connected to an insulated conductor-conduit, by insulating conduit sections, so that the sprinkler would not require to be insulated but could be earthed.

Figure 8:
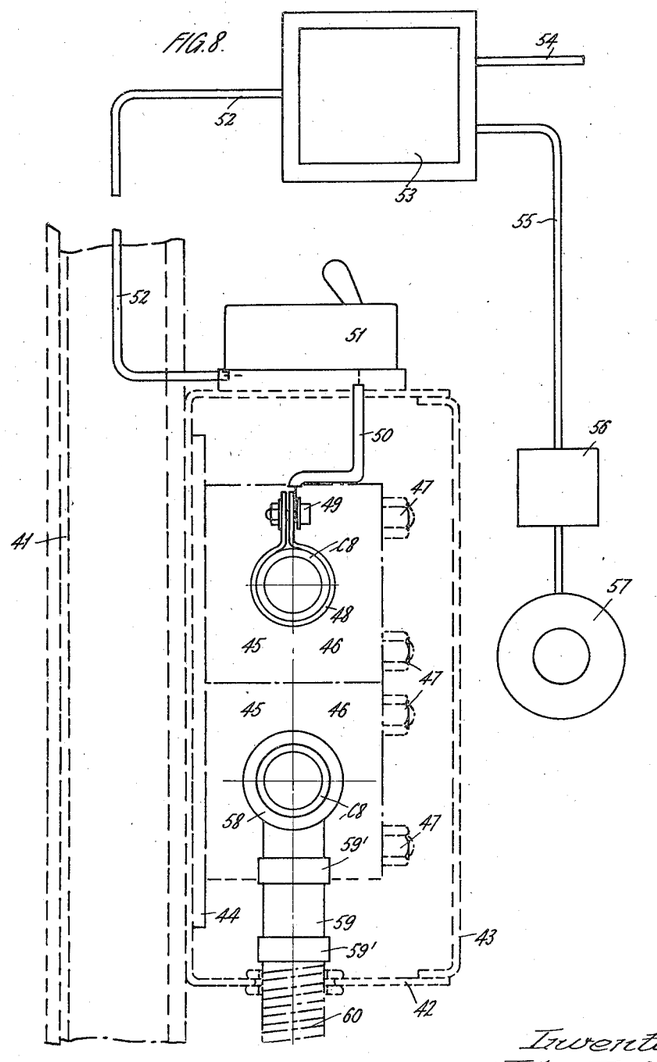
Fig. 8 is a transverse elevation of the mode of insulation and connection.

Referring now to Fig. 8, which illustrates the mode in which the conductor-conduits would be supported from a wall or a series of vertical columns 41; the continuous steel casing 42 traversing the length of the corridor, alley-way or the like would be fixed to the supports 41 and would be fitted with a detachable door 43, and would carry at intervals a base plate 44 adapted to take pairs of bearings blocks 45, 46 of insulated material, each having a semi-circular opening corresponding with the external diameter of the conduits $c8$, which blocks are secured to the base plate 44 by bolts 47; this figure shows the mode in which a branch connection to a fuse distribution board 53 is made; 48 is a clamping fitting the exterior of the conductor-conduit $c8$ within the box 42, a tight joint being made by means of the clamping screw 49, which screw also is used as a terminal connection for the conductor 50 connected to one terminal of a switch 51, the other terminal of which is connected by a conductor 52 to the busbar of a fuse distribution box, from which two branch conduits 54 and 55 are led, 55 being shown connected to the motor starter 56 of a motor 57.

The connection to the sprinkler system is made as follows:—

Figures 9, 10, 11, 11A:
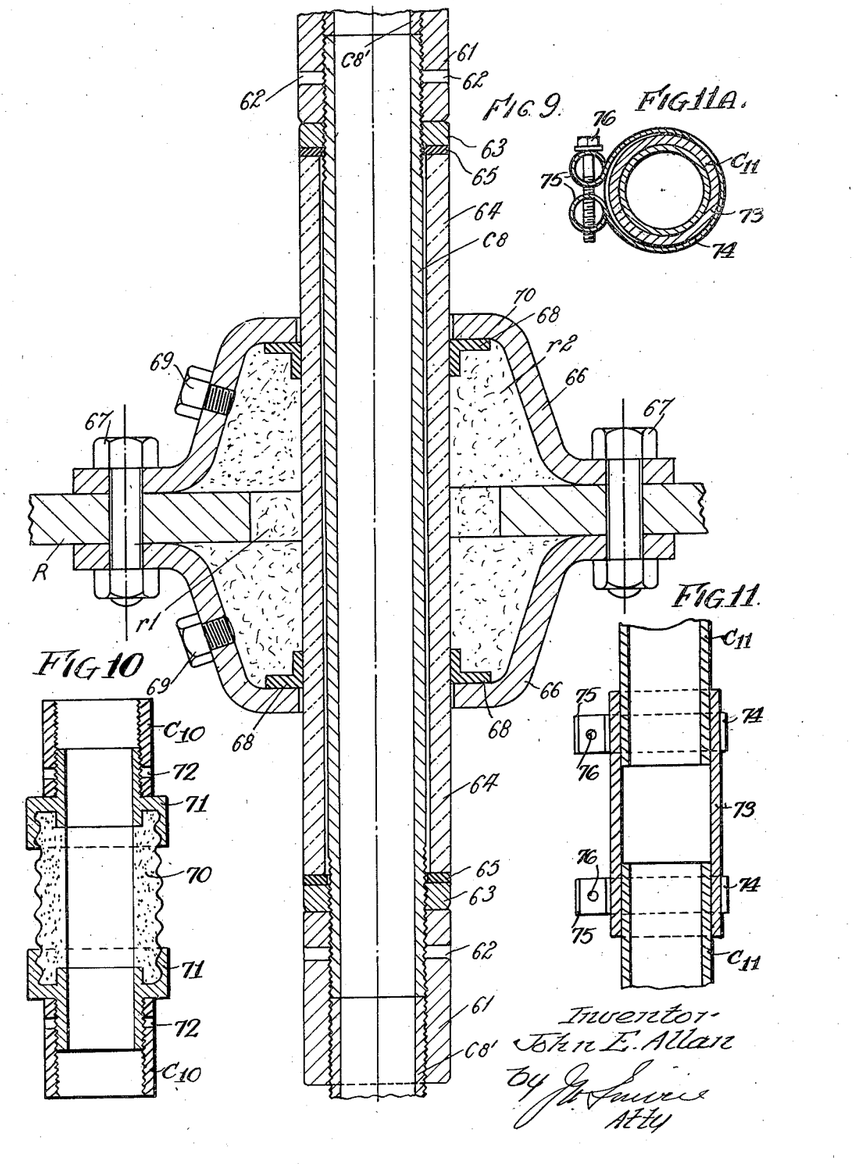
Fig. 9 shows in medial section the arrangement where the conductor passes through a bulkhead or deck.
Figs. 10 and 11 which are longitudinal sections show modes of insulating lengths of conductor-conduit.
Fig. 11A is a cross-section of Fig. 11.

58 is a T-piece connecting the screwed connections to adjacent lengths of the conduit $c8$ located within the box 42; 59 is an insulator of the type illustrated in Fig. 10 and has two end screwed sockets 59' moulded on the ends of the insulator, one of these screws into the T-piece 58 and the other takes the screwed attachment of a length of flexible hose 60 which is led to the sprinkler.

Fig. 9 shows how the conductor-conduit is arranged when it has to pass through, say a deck R. C$^8$ is the length of conductor-conduit passing through the deck R, and it is preparatorily fitted with a surrounding tube 64, of porcelain, glass or the like insulator held in place by packings 65 and nuts 63 fitting the screwed ends of C$^8$; the screwed unions 61 are employed to connect this length of conduit to the adjacent lengths of C$^{8'}$, the conduit with the insulator over it passes through an opening $r1$ in the deck R and also through two castings 66, one on each side of the deck R secured together and to the deck by the bolts 67; L-shaped packing rings 68 are provided which closely fit the insulator 64 and close openings in the castings through which the conduit passes; 69 are screwed plugs fitting openings in the respective parts 66, through which they may be filled with an insulating compound $r2$; 62 are openings in the couplings 61 through which molten solder may be introduced to make joint between the coupling 61 and the conductor-conduit C$^9$.

Referring now to Fig. 10 which shows one mode in which two adjacent lengths of conductor-conduit C$^{10}$ are connected together by tubular insulator; 70 is a tube of glass, porcelain or other insulator having moulded on its opposite ends screwed union pieces 71 which are adapted to respectively screw into the internally screwed portions of the conductor-conduit C$^{10}$, holes 72 being provided to permit the introduction of the molten solder to make joint.

In the modifications illustrated in Fig. 11 two lengths C$^{11}$ of conductor-conduit are connected together by a short length 73 of fabricated hose-pipe, rubber or other flexible insulating material, the joints between 73 and C$^{11}$ are made by encircling clamps 74, the ends of which are shaped as at 75 to take clamping screws 76.

Figures 12, 13:
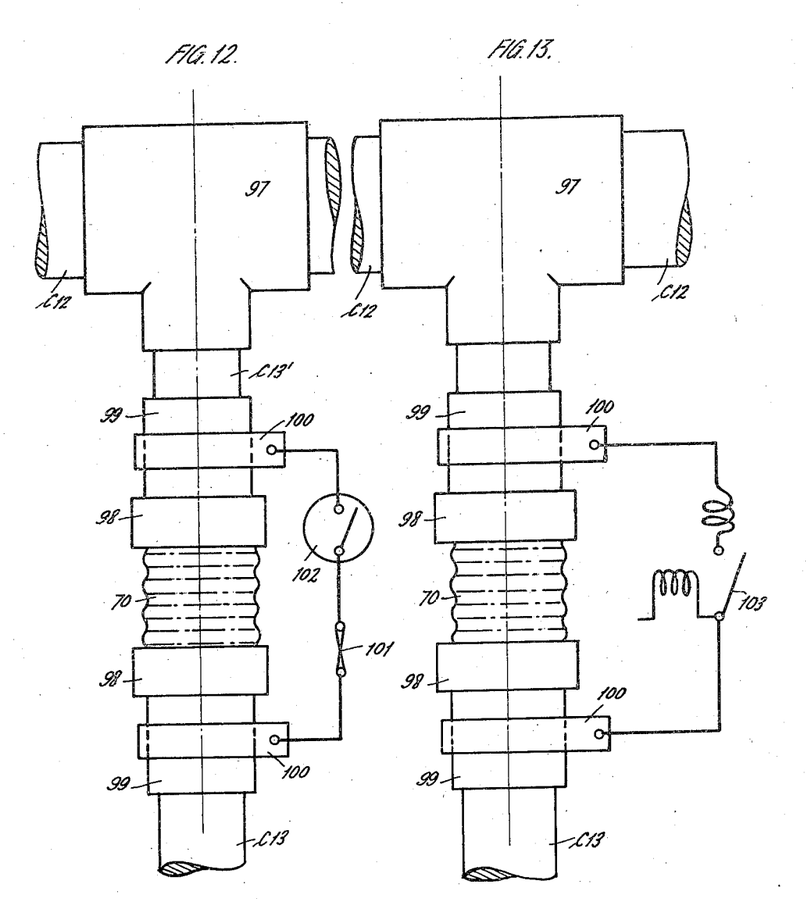
Figs. 12 and 13 show safety arrangements where the conductor-conduits are reduced in size.

Figs. 12 and 13 show the arrangement adopted when it is desired to reduce the size of conductor-conduit C$^{12}$ to a smaller size of conductor-conduit C$^{13}$ whilst adopting the usual precautions of providing current interrupting device to protect the conduit of smaller diameter, which would be unprotected by fuses suitable for protecting the conduit C$^{12}$. To the smaller branch of the coupler 97 is screwed a short length of conductor-conduit C$^{13'}$ of smaller diameter and C$^{13'}$ is connected to the branch conduit C$^{13}$ by an insulating fitting 70 as described in connection with Fig. 9; the screwed end connections 98 moulded on the ends of the insulator 70 having, in this case, extensions 99 internally screw-threaded to take screwed portions of the conductor-conduits C$^{13'}$ and C$^{13}$. Generally the size of the conductor-conduits, i. e. the cross sectional areas of their walls, will be reduced, from the end connected to the pole of the electric power supply, in accordance with the reduction of current carried, lengths of conductor-conduit of progressively decreasing diameters being connected together.

Conductor clamps 100 are fitted to the portions 99 and are connected together by a fuse 101 and switch 102.

Alternatively as shown in Fig. 13 instead of a switch 102 and fuse 101, a circuit-breaker 103 may be employed to connect the clamps 100. Should the conductor-conduit C¹³ be overloaded the fuse 101 in Fig. 12 is "blown", or the circuit-breaker 103 in Fig. 13 is opened.

The arrangement and connections of the conductor-conduit, and the details of construction would be varied in accordance with the size of the installation and the nature of the conditions to be fulfilled.

Having now fully described my invention I declare that what I claim is:—

1. A combined electric energy and fluid pressure distribution installation comprising in combination a supply of electric power; a supply of fluid maintained at a prescribed pressure; a series of distributed electric power consuming devices, one pole of each being connected to one of the poles of the electric power supply; a series of fluid control devices each comprising a passageway and means for closing the passageway; a tubular conductor-conduit, the wall of which is connected to the other pole of the electric power supply and to the other poles of the electric power consuming devices, and the bore of which is connected to the fluid supply and to the several passageways of the fluid control devices; and an insulated coupling device located in the conductor-conduit between the electric power consuming devices and the fluid supply and pressure maintaining means.

2. Apparatus as claimed in claim 1, in which the tubular conductor to which the power consuming devices are connected and to the bore of which the fluid control devices are connected is connected to a pole of the electric supply maintained at earth potential.

3. An electric energy and fluid-pressure distribution installation comprising a supply of electric power; a fluid supply means; a series of fluid discharge devices each comprising a passageway, and means for closing said passageway; a conductor-conduit connecting the fluid supply to the several passageways of said fluid discharge devices; a conductor connecting one pole of the electric power supply to the conductor-conduit; a series of distributed electric power consuming devices, one pole of each being connected to the conductor-conduit and the other pole to the other pole of the electric power supply; and an insulated coupling device located in the conductor-conduit between the fluid-supply source and the point of connection of said conductor-conduit to the electric power supply.

4. A combined electric energy and fluid pressure distribution installation comprising in combination a supply of electric power; a supply of fluid maintained at a prescribed pressure; a series of distributed electric power consuming devices, one pole of each being connected to one of the poles of the electric power supply; a series of fluid control devices each comprising a passageway and means for closing the passageway; a tubular conductor-conduit, a conductor adapted to connect the wall of said conductor-conduit to the other pole of the electric power supply, conductors connecting the other poles of the electric power consuming devices to the conductor-conduit, means connecting the bore of said conductor-conduit to the fluid supply and to the several passageways of the fluid control devices; an insulated coupling device located in the conductor-conduit between the electric power consuming devices and the fluid supply and pressure maintaining means; a switch in the conductor connecting the conductor-conduit to the electricity supply means, pressure-sensitive means responsive to the pressure of fluid in the bore of the conductor-conduit and an operative connection between said means and the switch, whereby when the pressure in said conductor-conduit falls by the operation of a fluid control device the conductor-conduit is disconnected from the electricity supply.

5. In a combined electric energy and fluid pressure distribution installation, in combination;— a supply of electric power; a supply of fire-extinguishing fluid at a pressure greater than that of the atmosphere; a series of distributed electric power consuming devices, one pole of each being connected to one of the poles of the electric power supply; a series of fluid control devices, each comprising a passage-way and means for closing the passage-way; a tubular conductor-conduit the wall of which is electrically connected to the other pole of the electric power supply, and to the other poles of the electric power consuming devices, and the bore of which is connected to the fluid supply and to the several passage-ways of the fluid control devices; means for electrically insulating the fire-extinguishing fluid supply means, when the latter is at earth potential, from the portion of the tubular conductor which is connected to the pole of electric supply; means for disconnecting the part of the bore of the tubular conductor which is connected to the fluid control devices from the fluid supply when, and only when, the pressure in the said bore is substantially equal to a predetermined pressure; and supply means for supplying an initial charging fluid to the said bore sufficient to maintain therein, when and only when, all the pressure control devices are closed, the last mentioned prescribed pressure.

6. In a combined electric energy and fluid pressure distribution installation, in combination;—a supply of electric power; a supply of fire-extinguishing fluid at a pressure greater than that of the atmosphere; a series of distributed electric power consuming devices, one pole of each being connected to one of the poles of the electric power supply; a series of fluid control devices, each comprising a passage-way and means for closing the passage-way; a tubular conductor-conduit the wall of which is electrically connected to the other pole of the electric power supply and to the other poles of the electric power consuming devices, and the bore of which is connected to the fluid supply and to the several passage-ways of the fluid control devices; means for electrically insulating the fire-extinguishing fluid supply means, should the latter be at earth potential, from the portion of the tubular conductor which is connected to the pole of electric supply; means for disconnecting the part of the bore of the tubular conductor which is connected to the fluid control devices from the fluid supply when, and only when, the pressure in the said bore is substantially equal to a predetermined pressure; supply means for supplying an initial charging fluid to the said bore sufficient to maintain therein, when and only when, all the pressure control devices are closed, the last mentioned prescribed pressure; means for insulating the part of the conductor-conduit connected to the pole of the electric supply from the means for supplying the charging fluid should the said means be at earth potential; a main switch by which the connection between the tubular conductor-conduit and the pole of the electric power supply is made; and means controlled by the pressure of the initial charging fluid in the bore of the conductor-conduit for operating the main switch, which means permit the main switch to open when the said pressure falls below its predetermined value.

7. In a combined electric energy and fluid pressure distribution installation, in combination;—a supply of electric power; a supply of fire-extinguishing fluid at a pressure greater than that of the atmosphere; a series of distributed electric power consuming devices, one pole of each being connected to one of the poles of the electric power supply; a series of fluid control devices, each comprising a passage-way and means for closing the passage-way; a tubular conductor-conduit the wall of which is electrically connected to the other pole of the electric power supply and to the other poles of the electric power consuming devices, and the bore of which is connected to the fluid supply and to the several passage-ways of the fluid control devices; means for electrically insulating the fire-extinguishing fluid supply means, should the latter be at earth potential, from the portion of the tubular conductor which is connected to the pole of electric supply; means for disconnecting the part of the bore of the tubular conductor which is connected to the fluid control devices from the fluid supply when, and only when, the pressure in the said bore is substantially equal to a predetermined pressure; supply means for supplying an initial charging fluid to the said bore sufficient to maintain therein, when and only when, all the pressure control devices are closed, the last mentioned prescribed pressure; means for insulating the part of the conductor-conduit connected to the pole of the electric supply from the means for supplying the charging fluid should the said means be at earth potential; a main switch by which the connection between the tubular conductor-conduit and the pole of the electric power supply is made; electro-magnetic means controlled by the pressure of the initial charging fluid in the bore of the conductor-conduit for operating the main switch, which means permit the main switch to open when the said pressure falls below its predetermined value; a cut-off valve located between the conductor-conduit and the fire-extinguishing fluid supply, adapted when closed to cut off the said supply from the bore of the conductor-conduit; an auxiliary switch in the circuit of the main switch electro-magnetic controlling means and closed only when the cut-off valve is fully open, said auxiliary switch when open rendering said electro-magnetic means inoperative to hold the main switch closed.

8. In a combined electric energy and fluid pressure distribution installation, in combination;—a supply of electric power; a supply of fire-extinguishing fluid at a pressure greater than that of the atmosphere; a series of distributed electric power consuming devices, one pole of each being connected to one of the poles of the electric power supply; a series of fluid control devices, each comprising a passage-way and means for closing the passage-way; a tubular conductor-conduit the wall of which is adapted to be electrically connected to the other pole of the electric power supply and to the other poles of the electric power consuming devices, and the bore of which is connected to the fluid supply and to the several passage-ways of the fluid control devices; means for electrically insulating the fire-extinguishing fluid supply means, should the latter be at earth potential, from the portion of the tubular conductor which is connected to the pole of the electric power supply; a main valve which when closed disconnects the part of the bore of the conductor connected to the fluid control devices from the fluid supply; means for supplying an initial charging fluid to the said part of the bore sufficient to maintain in the said bore, when and only when all the fluid control devices are closed, a predetermined pressure; means tending to open the valve; closing means to hold the main valve closed against an opening force; a switch by which the connection between the tubular conductor and the pole of the electric power supply is made; closing means to hold the switch closed against an opening force; and means controlled by the pressure of the initial charging fluid in the bore of the conductor-conduit which when the said pressure falls below its predetermined value renders the two said closing means inoperative.

9. In a combined electric energy and fluid pressure distribution installation, in combination;—a supply of electric power; a supply of fire-extinguishing fluid at a pressure greater than that of the atmosphere; a series of distributed electric power consuming devices, one pole of each being connected to one of the poles of the electric power supply; a series of fluid control devices, each comprising a passage-way and means for closing the passage-way; a tubular conductor-conduit the wall of which is adapted to be electrically connected to the other pole of the electric power consuming devices, and the bore of which is connected to the fluid supply and to the several passage-ways of the fluid control devices; means for electrically insulating the fire-extinguishing fluid supply means, should the latter be at earth potential, from the portion of the tubular conductor which is connected to the pole of the electric power supply; a main valve which when closed disconnects the part of the bore of the conductor connected to the fluid control devices from the fluid supply; means for supplying an initial charging fluid to the part of the bore sufficient to maintain in the said bore, when and only when all the fluid control devices are closed, a predetermined pressure; means tending to open the valve; electro-magnetic means to hold the main valve closed against an opening force; a main switch to connect the conductor-conduit to the pole of the electric power supply; electro-magnetic means to hold the main switch closed against an opening force; an auxiliary switch in series with the energizing circuits of the said two electro-magnetic means and which when open prevents the energizing of said circuits; means controlled by the initial charging pressure in the bore of the conductor-conduit and adapted to close the auxiliary switch when the said pressure is substantially equal to its predetermined value.

10. The combination with the elements of claim 9;—of a shut-off valve located between the main valve and the supply of fire-extinguishing fluid and which, when shut, cuts off the bore of the conductor-conduit from the said supply; an auxiliary switch in the energizing circuit of the electro-magnetic means by which the main switch is held closed; and means connecting the auxiliary switch to the cut-off valve which closes the auxiliary switch when the cut-off valve is open.

11. In a combined electric energy and fluid pressure distribution installation, in combination;—a supply of electric power; a supply of fire-extinguishing fluid at a pressure greater than that of the atmosphere; a series of distributed electric power consuming devices, one pole of each being connected to one of the poles of the electric power supply; a series of fluid control devices, each comprising a passage-way and means for closing the passage-way; a tubular conductor-conduit the wall of which is adapted to be electrically connected to the other pole of the electric power supply, and to the other poles of the electric power consuming devices; means for electrically insulating the fire-extinguishing fluid supply means, when the latter is at earth potential, from a portion of the tubular conductor-conduit which is connected to the fluid control devices from the fluid supply; a valve which when closed disconnects the portion of the bore of the conductor connected to the fluid control devices from the fluid supply; means for supplying an initial charging fluid to the said part of the bore sufficient to maintain in the said bore, when and only when all the fluid control devices are closed, a predetermined pressure; means tending to open the valve; means controlled by the pressure of the initial charging fluid in the bore of the tubular conductor connected mechanically to the main valve and closing the main valve when the said pressure is substantially equal to its predetermined value; a main switch to connect the conductor to the pole of the electric power supply; electro-magnetic means for closing the main switch; an auxiliary switch in the energizing circuit of the said means connected to the said control means and closed by the said means when the latter closes the main valve.

12. The combination with the elements of claim 11, of a shut-off valve located between the main valve and the fire-extinguishing fluid supply; a second auxiliary switch in the energizing circuit of the electro-magnetic means for closing the main valve and connected to the shut-off valve and closed by the shut-off valve when the latter is open.

13. In a combined electric energy and fluid pressure distribution installation, in combination;—a supply of electric power; a supply of fire-extinguishing fluid at a pressure greater than that of the atmosphere; a series of distributed electric power consuming devices, one pole of each being connected to one of the poles of the electric power supply; a series of fluid control devices, each comprising a passage-way and means for closing the passage-way; a tubular conductor-conduit the wall of which is electrically connected to the other pole of the electric power supply, and to the other poles of the electric power consuming devices, and the bore of which is connected to the fluid supply and to the several passage-ways of the fluid control devices; means for electrically insulating the fire-extinguishing fluid supply means, should the latter be at earth potential, from the portion of the tubular conductor which is connected to the pole of electric supply; the said conductor-conduits being made in lengths, the bores and cross-sectional areas of the walls of which lengths are reduced from the end connected to the pole of the electric power supply in accordance with the reduction of current carried; insulating tubular means connecting the bores of the adjacent ends of successive conduits of differing areas; means for electrically connecting said adjacent ends; and devices inserted in series with said means which when the current carried exceeds a predetermined limit disconnect the said ends.

JOHN EDWARD ALLAN.